United States Patent
Zhitomirsky et al.

(10) Patent No.: US 11,010,387 B2
(45) Date of Patent: May 18, 2021

(54) JOIN OPERATION AND INTERFACE FOR WILDCARDS

(71) Applicant: Microsoft Technology Licensing, LLC, Redmond, WA (US)

(72) Inventors: Benjamin Mark Zhitomirsky, Herzliya (IL); Roy Ben Ofer, Tel Aviv (IL); Adi Eldar, Kiryat Ono (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 523 days.

(21) Appl. No.: 15/726,962

(22) Filed: Oct. 6, 2017

(65) Prior Publication Data

US 2019/0108260 A1    Apr. 11, 2019

(51) Int. Cl.
*G06F 16/2455* (2019.01)

(52) U.S. Cl.
CPC .... *G06F 16/2456* (2019.01); *G06F 16/24554* (2019.01); *G06F 16/24561* (2019.01); *G06F 16/24562* (2019.01)

(58) Field of Classification Search
CPC ........... G06F 16/2456; G06F 16/24554; G06F 16/24562; G06F 16/24561; G06F 16/278; G06F 16/285
See application file for complete search history.

(56) References Cited

U.S. PATENT DOCUMENTS

| | | | |
|---|---|---|---|
| 5,724,573 A | 3/1998 | Agrawal et al. | |
| 5,848,408 A | 12/1998 | Jakobsson et al. | |
| 6,263,327 B1 | 7/2001 | Aggarwal et al. | |
| 6,263,331 B1* | 7/2001 | Liu | G06F 16/24552 |
| 6,324,533 B1 | 11/2001 | Agrawal et al. | |
| 7,092,954 B1* | 8/2006 | Ramesh | G06F 16/2456 707/714 |
| 7,359,913 B1 | 4/2008 | Ordonez | |

(Continued)

FOREIGN PATENT DOCUMENTS

| | | |
|---|---|---|
| WO | 2009051471 A2 | 4/2009 |
| WO | 2015176315 A1 | 11/2015 |

OTHER PUBLICATIONS

Japem et al. '"Like" operator in inner join in SQL', 2014 [retrieved on Jun. 19, 2020], [Retrieved from the Internet] https://stackoverflow.com/questions/23276344/like-operator-in-inner-join-in-sql (Year: 2014).*

"International Search Report and Written Opinion Issued in PCT Application No. PCT/US18/033992", dated Nov. 21, 2018, 12 Pages.

(Continued)

*Primary Examiner* — James E Richardson
(74) *Attorney, Agent, or Firm* — Fiala & Weaver P.L.L.C.

(57) ABSTRACT

Embodiments relate to efficiently performing an inner join on segments from a data source, where the segments have wildcards in join columns. An algorithm for an inner segment join operator may build a location map that describes locations, by segment and column, of values in the join columns of rows in the segments. A map of wildcard locations, by segment and column, may also be constructed. The location map may be supplemented with information from the wildcard map. The data source is scanned and contents of rows in the data source are queried against the location map to join rows with segments that match due to either matching values or wildcard presence. A user interface may be provided to facilitate construction of joins using the inner segment join operator.

20 Claims, 11 Drawing Sheets

(56) References Cited

U.S. PATENT DOCUMENTS

| | | |
|---|---|---|
| 7,644,083 B1 | 1/2010 | Sirek |
| 8,250,105 B2 | 8/2012 | Bollinger et al. |
| 8,301,665 B2 | 10/2012 | Sieb |
| 8,612,421 B2 | 12/2013 | Dombroski et al. |
| 8,655,911 B2 | 2/2014 | Li et al. |
| 8,660,985 B2 | 2/2014 | Wang et al. |
| 8,935,257 B1 | 1/2015 | Vemuri et al. |
| 9,336,275 B2 | 5/2016 | Potapov et al. |
| 9,563,669 B2 | 2/2017 | Yoshida |
| 2002/0194157 A1 | 12/2002 | Zait et al. |
| 2003/0009456 A1 | 1/2003 | Shintani et al. |
| 2005/0198019 A1* | 9/2005 | Cunningham .... G06F 16/24535 |
| 2009/0100002 A1* | 4/2009 | Nolan ................. G06F 16/2456 |
| 2011/0196866 A1* | 8/2011 | Cooper ................. G06F 16/284 707/737 |
| 2012/0124045 A1 | 5/2012 | Pendap et al. |
| 2014/0074853 A1* | 3/2014 | Nath ................... G06F 16/2246 707/743 |
| 2014/0208111 A1 | 7/2014 | Brandwine et al. |
| 2014/0250142 A1* | 9/2014 | Pradhan ............. G06F 16/2453 707/765 |
| 2015/0154186 A1* | 6/2015 | Meinecke ........... G06F 16/2456 707/803 |
| 2017/0255672 A1* | 9/2017 | Attaluri ................... G06F 16/27 |
| 2018/0196833 A1* | 7/2018 | Corradi ................... G06F 16/25 |

OTHER PUBLICATIONS

Bonchi, et al., "On Closed Constrained Frequent Pattern Mining", in Proceedings of the 4th IEEE International Conference on Data Mining, Nov. 1, 2004, 8 Pages.

Chang, Chia-Hsiang, "From Regular Expressions to DFA's using Compressed NFA's", a Dissertation Submitted in Partial Fulfillments of the Requirements for the Degree of Doctor of Philosophy, Oct. 1992, 242 Pages.

Khan, et al., "Modified BitApriori Algorithm: An Intelligent Approach for Mining Frequent Item-Set", in Proceedings of International Conference on Advances in Signal Processing and Communication, Jun. 2013, pp. 813-819.

Mimaroglu, et al., "Clustering and Approximate Identification of Frequent Item Sets", in Proceedings of the Twentieth International Florida Artificial Intelligence Research Society Conference, May 7, 2007, 5 Pages.

Rheinlander, et al., "Fast Similarity Searches and Similarity Joins in Oracle DB", in Proceedings of DOAG Conference, Nov. 2010, 6 Pages.

Antognini, Christian, "Chapter 10, Partial Partition-Wise Joins, Choosing the Join Method", in Book of Troubleshooting Oracle Performance, Jun. 23, 2008, pp. 441-447.

"International Search Report and Written Opinion Issued in PCT Application No. PCT/US2018/046387", dated Nov. 26, 2018, 15 Pages.

* cited by examiner

SOURCE DATA TABLE
D
k INDEX COLUMNS

| DC1 | ... | DCj | ... | DCk |
|---|---|---|---|---|

D1 ... Di ... Dn 102
122

SEGMENTS TABLE
S
k INDEX COLUMNS

| SC1 | ... | SCj | ... | SCk |
|---|---|---|---|---|

S1 ... Si ... Sm 118  106  120

WILDCARD VALUES PER COLUMN

| W1 | ... | Wj | ... | Wk |
|---|---|---|---|---|

W

162

160 — HASH FUNCTION

JOIN OPERATION AND INTERFACE FOR WILDCARDS

BACKGROUND

As computing proliferates, masses of data accumulate. Nearly all modern industry employs machine computation. Many forms of computation generate data that is stored and then analyzed. So-called big data is common in meteorology, industrial processes, sensor networks, computer diagnostics logging, financial transactions, medicine, astronomy, and many other fields. A dataset can take many forms, for instance a large flat file with many observations, an indexed database table with billions of rows of samples, an abstract cloud storage unit, and so forth. The magnitude of many datasets can be considerable and tools for analysis need to be highly efficient in terms of time and resources consumed. Tools that are inefficient with respect to time or resources can be impractical for large datasets. If an analysis algorithm requires, for instance, exponential time or resources in proportion to a dataset, the algorithm's time and resource requirements may be impossible to meet when applied to sufficiently large datasets.

A common analysis technique on large datasets is to derive segments of data from a dataset. Data segmentation can be performed in a variety of known ways. For instance, segments can be derived by clustering algorithms such as K-means, Expectation-Maximization, mean-shifting, frequency binning, frequent itemset mining, and others. Segments can also be formed by machine classifiers, pattern recognizers, and the like. Humans can manually define subsets or segments of a large dataset. Time series data may be segmented with a variety of techniques such as Hidden Markov Models. Such segments are useful for identifying hidden information in data.

To make full use of segments, it is desirable to join segments with their source dataset. That is, it can be helpful to know which rows in the source dataset could have contributed to which segments. Under certain constrained conditions, some algorithms are available for segment joining. For instance, the hash join algorithm is a well-known way to join segments with their source data. However, segments from a same dataset often have overlapping data (i.e., need not be disjoint) and they may have varying dimensions. Furthermore, it is common to have segments that contain wildcards, i.e., "any" or "don't care" values. Such conditions in large scale datasets preclude the use of algorithms like the hash join. With the ordinary hash join, finding the data points in a source dataset that belong to a certain segment (to apply an aggregation to each) has required an extra query per segment, resulting in a long and complicated flows that are unsuitable for large datasets. In other words, prior segment joins have required a full query of the source dataset for each segment, which is cost prohibitive.

There is a need for techniques to efficiently join segments containing wildcards with large source datasets in ways that possibly scale linearly with respect to the number of segments and the number of columns being joined.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to efficiently performing an inner join on segments from a data source, where the segments have wildcards in join columns. An algorithm for an inner segment join operator may build a location map that describes locations, by segment and column, of values in the join columns of rows in the segments. A map of wildcard locations, by segment and column, may also be constructed. The location map may be supplemented with information from the wildcard map. The data source is scanned and contents of rows in the data source are queried against the location map to join rows with segments that match due to either matching values or wildcard presence. A user interface may be provided to facilitate construction of joins using the inner segment join operator.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
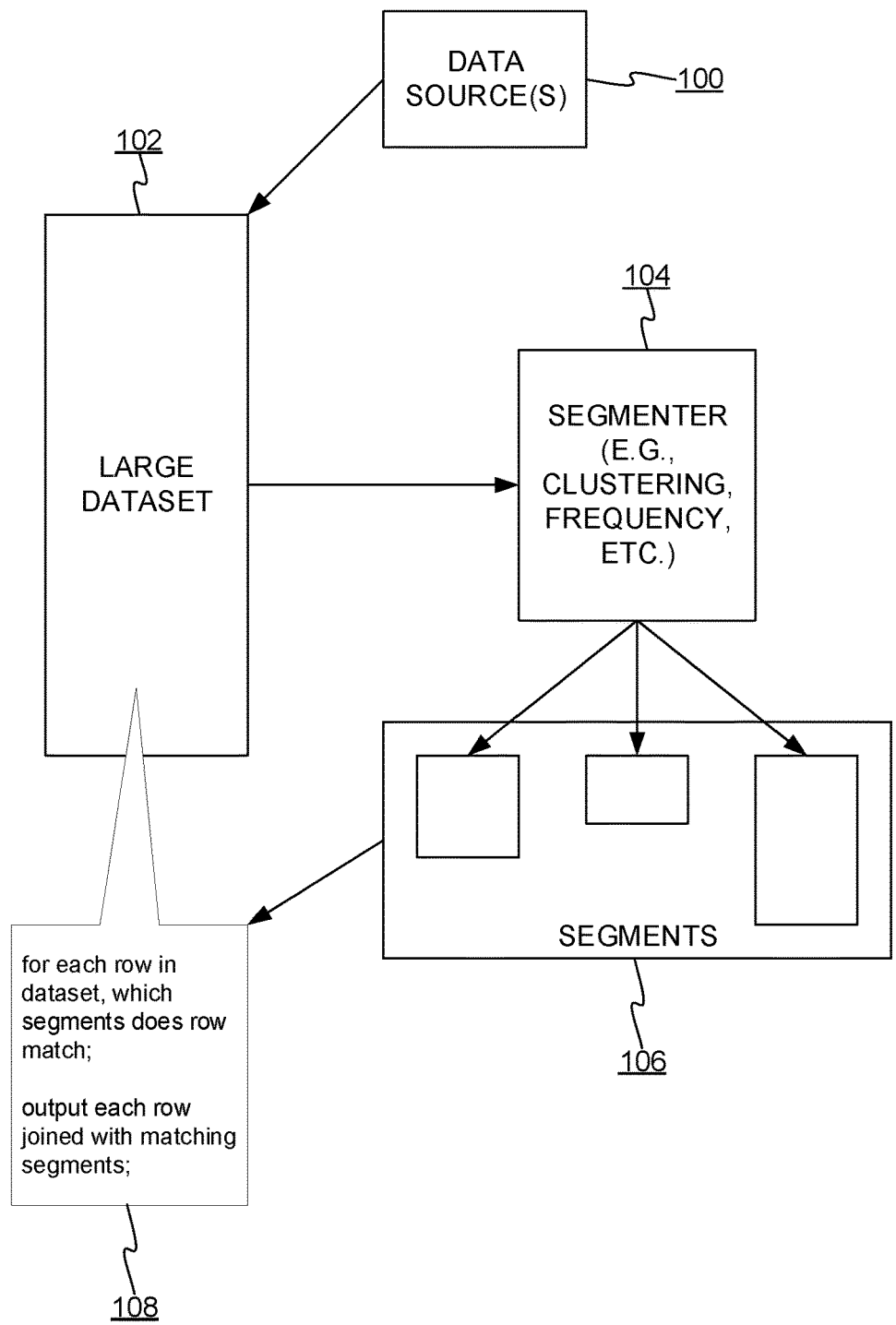
FIG. 1 shows a data flow related to a join operator.

FIG. 1 shows a data flow related to a join operator. Initially, data is collected from a data source 100. The data source 100 can be any type of device or devices that output varying data. The data source 100 might be a set of servers generating log files. The data source 100 might be a financial system generating financial transactions. The data source 100 could be a sensor network that provides timestamped sensed measurement values and accompanying metadata. The data source 100 could be cellular network storing call records. There is no limit to the type of devices that are generating data that is accumulated into perhaps large datasets. The origin of data is not significant and the existence of a large dataset 102 may be presumed.

The dataset 102 may be any set of rows structured as a table with columns including one or more index columns, the rows having fields in the index columns. Although not required, embodiments described herein may be particularly helpful for datasets on the order of millions or greater. In one embodiment, the dataset 102 is time series data where the rows are each timestamped and can be chronologically ordered relative to each other. Timestamped data can be segmented using a variety of known time series filters. The segments may have rows in common with each other. The dataset 102 may have one or more index columns. As used herein, "index" refers to a column on which a join is performed. An index column may or may not have a traditional index structure that orders the contents of the column. Moreover, the structure of the dataset 102 is not significant, so long as individual fields or cells of data are addressable in two or more dimensions.

Given the dataset 102, a segmenter 104 forms segments 106 from the dataset 102. The segmenter 104 may implement any known algorithm for constructing segments 106 from a set of data. As noted in the Background, the segmenter 104 might be based on clustering, classification, time series segmentation, anomaly detection, pattern recognition, and so forth. The segmenter 104 might be a combination (e.g., pipeline) of different segmentation algorithms. In addition, the segments 106 might be formed from different applications of respective different segmenters 106. For example, one segment might be from an Expectation-Maximization clustering algorithm of the dataset 102 and another segment might be derived from applying a machine classifier to the dataset 102.

The set or table of segments 106 may include any segments that have columns that respectively correspond to the join columns of the dataset 102. The segments 106 may include additional columns that are not part of the join columns. The segments 106 may have varying dimensions with respect to each other; some segments may have columns not found in other segments. Any segment that is to be joined will have a column corresponding to the join column of the dataset to which it is being joined. Segment columns that are not part of the join may nonetheless be included in the final join output, as discussed below. Some data rows may be included in more than one segment 106. Furthermore, a segment may have wildcards in one or more of its join columns. A wildcard might be represented as a wildcard character, a null value, or even absence of a field. Within a single segment, wildcards can take different forms within respective different columns.

Given the dataset 102 and the segments 106, an inner join operator 108 is applied to the segments 106 and the dataset 102. The rows in segments 106 that have fields in the join column(s) that match a corresponding field in a row in the dataset are joined. Details are provided below.

Figure 2:
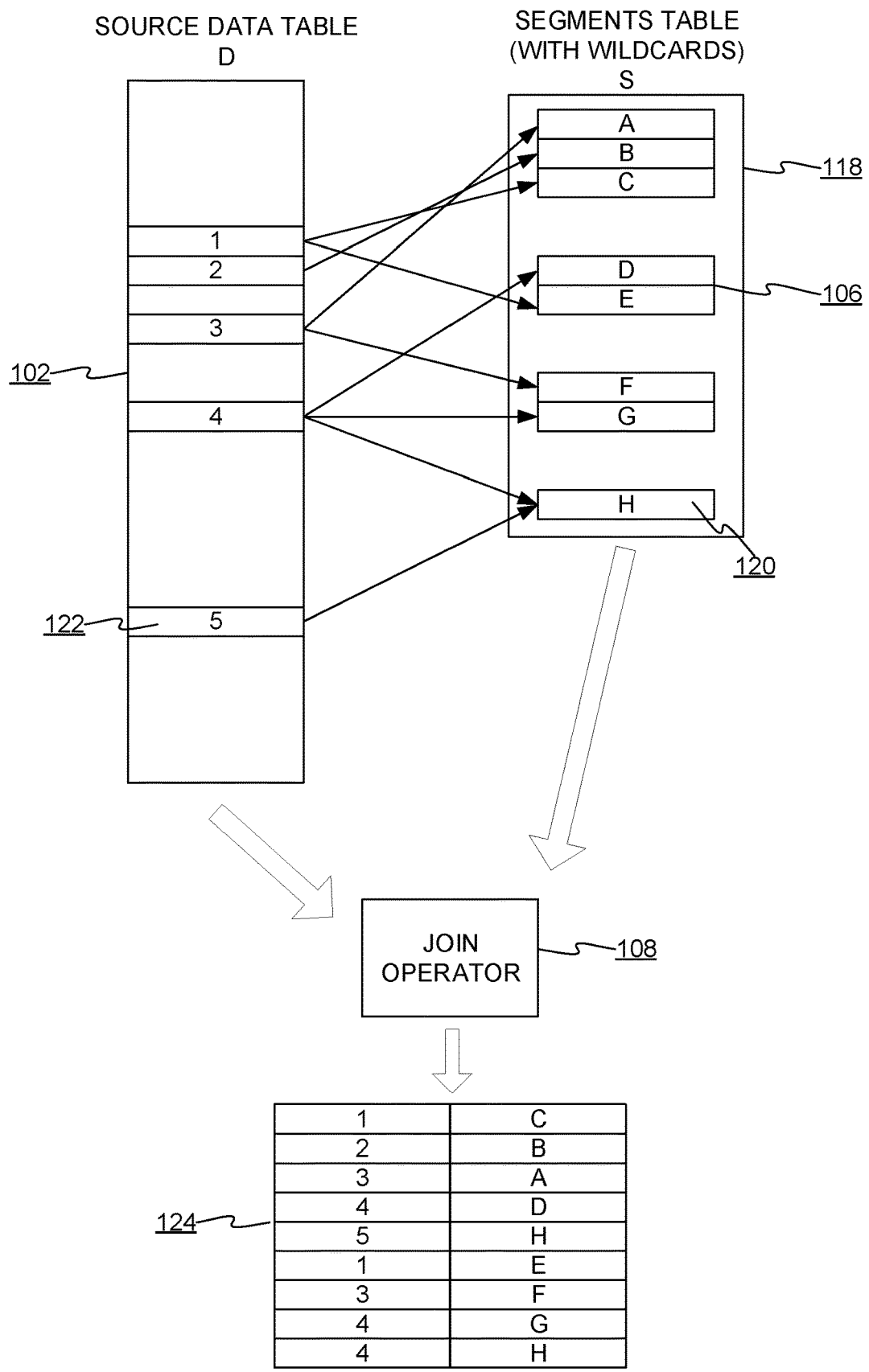
FIG. 2 shows additional details of a join operation.

FIG. 2 shows additional details of a join operation. When the join operator 108 is invoked, for a segment table 118, each segment row 120 that is found to match a dataset row 122 (on the join column(s)) is combined with the dataset row 122 in a join output 124. However, because the segments 106 may have wildcards in their join columns, performing a join on a large dataset may be cost-prohibitive unless techniques described herein are used. As described below, even when wildcards are present, and even when there is data overlap among the segments, it is possible to perform an inner join with only one scan of the segments table 118 and one scan of the dataset.

Figure 3:
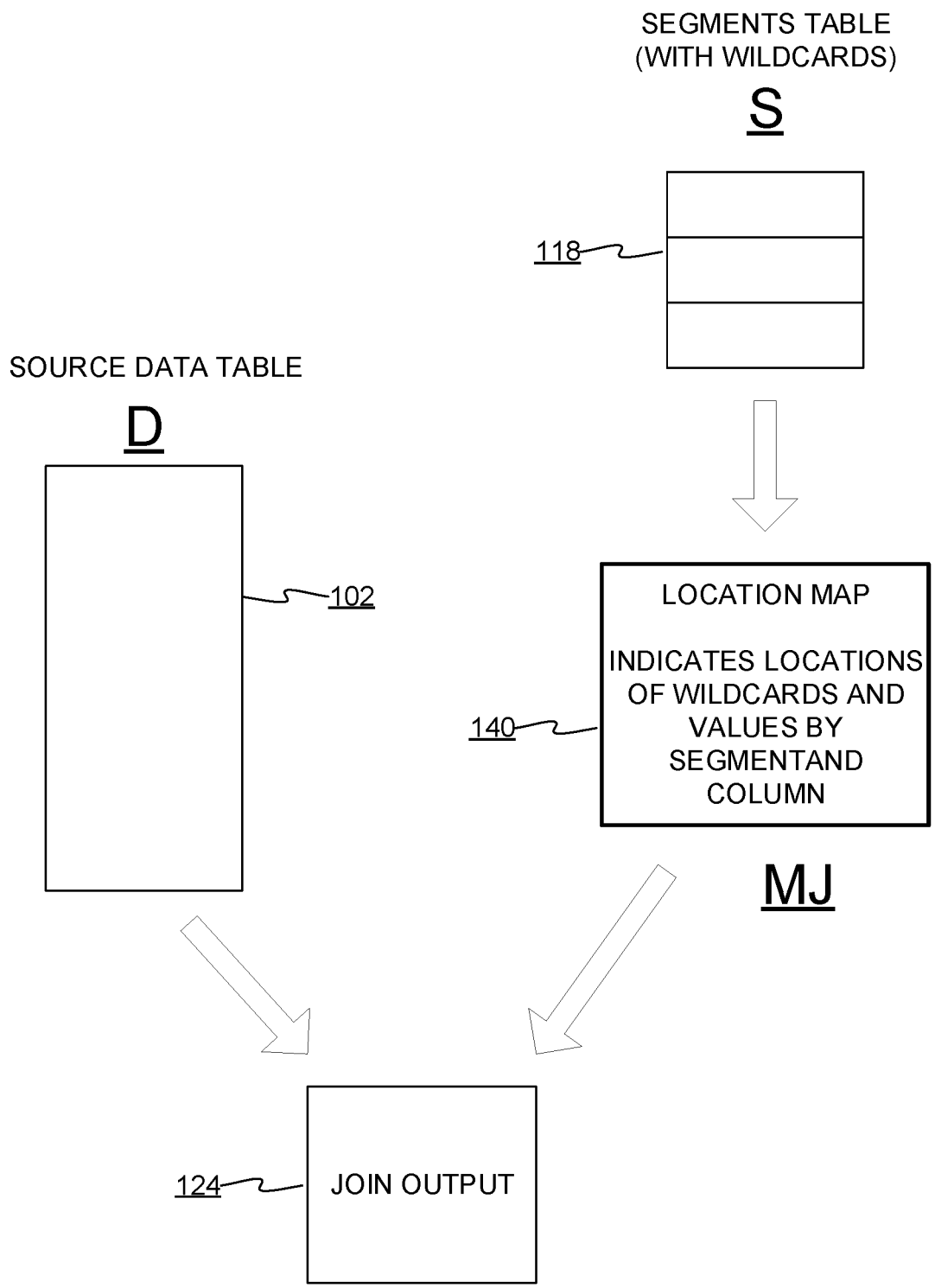
FIG. 3 shows a location map.

FIG. 3 shows a location map 140. The location map 140 is constructed by the algorithm that implements the join operator 108. The location map 140, as will be described in detail below, is one or more data structures that efficiently indexes contents of the segments table 118 for querying. That is, the location map 140 indicates the locations of values and wildcards in the segments table 118, by segment and column. The location map 140 may be addressable by join columns and segment numbers. Each addressable column and segment number in the location map 140 contains data about (i) whether there are wildcards in corresponding column of the corresponding segment, and (ii) which values are the fields of the corresponding segment at the corresponding column. As will be described below, the location map 140 can be constructed with a single scan of the segments table 118. The location map 140 may be constructed with the aid of other temporary data structures, as will be discussed. The location map 140 is used by the join operator 108 to produce the join output 124.

Figure 4:
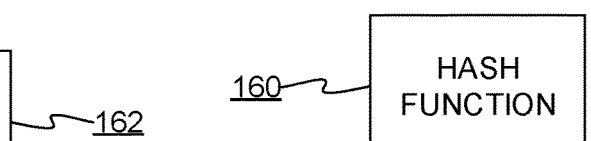
FIG. 4 shows details of a source dataset and a segment table.

FIG. 4 shows details of the source dataset 102 and segment table 118. The nomenclature shown in FIG. 4 will be referenced below to describe the join algorithm. It will be assumed that there are k join or index columns (k is any integer greater than zero). As noted above, although individual segments may have other (non-join) columns or dimensions, each should have a column that corresponds to one of the join columns in the source dataset 102. A segment column will be referred to as SC. The first SC will be referred to as SC1, the kth (last) SC will be referred to as SCk, and an arbitrary jth SC will be referred to as SCj, where $1 \leq j \leq k$. In respective correspondence with {SC1 ... SCk}, the dataset 102 has join data columns that will be referred to as DC. The first DC will be referred to as DC1, the kth DC will be referred to as DCk, and the jth DC will be referred to as DCj, where $1 \leq j \leq k$.

Other components will be provided for the join algorithm. A hash( ) function 160 is provided to compute hashes of values in the segments and the dataset. Although many hash functions will suffice, hashes with minimal probability of collisions are preferred. The "xxHash" is one suitable hash function (available on Github). A wildcard list 162 lists the wildcard values for each join column, which may be specified either as default values or as values specified in compliance with syntax of the join operator. For example, the first column W1 (corresponding to DC1 and SC1) may have an asterisk character as the wildcard, which indicates that any field in DC1 or SC1 that contains an asterisk is to be treated as a wildcard (a "don't-care" value). Other columns may have other wildcards. Some join columns may not have wildcards. If one of the entries in the wildcard list 162 is empty then there are no wildcards for that column. A "null" wildcard should have an explicit representation (e.g., "<null>") to distinguish from columns that do not have wildcards. In some embodiments, a field with a wildcard contains no other data; that is, a join column with a wildcard might only contain a wildcard. An empty entry in the wildcard list 162 indicates that there is no wildcard for that join column.

To summarize, an ith arbitrary data row in the dataset 102 will be referred to as Di. Similarly, an ith arbitrary segment will be referred to as Si. The dataset 102 has n data rows, and the segment table 118 has m segments. And:

m—is the number of segments;
k—is the number of index fields (on which join is performed);
S—is the segments table, S={S1, ..., Sm}, where Si is a segment represented by a i-row in the segments table
D—is the data table (dataset), D={D1, ..., Dn}, Di is the ith row;
W—lists the wildcards for each index 1 to k, Wj is the wildcard value for column j;
each segment Si contains index fields {SC1 ... SCk};
each data row Di contains index fields {DC1 ... DCk};
for any value v hash(v) is a calculated hash of v;
segment selection bit-mask B (shown later) is a bit-mask containing m bits, with each bit corresponding to a respective segment;
in B: bit j is 1 if segment j is selected, 0—otherwise;

Segment selection map Mj is a mapping hash(v)→B for field j;

WBj is segment selection map indicating segments containing wildcard value in column j (may be empty);

{0} is an empty bit-mask, map, set etc.;

|—bitwise "or" operation; and

&—bitwise "and" operation.

Figure 5:
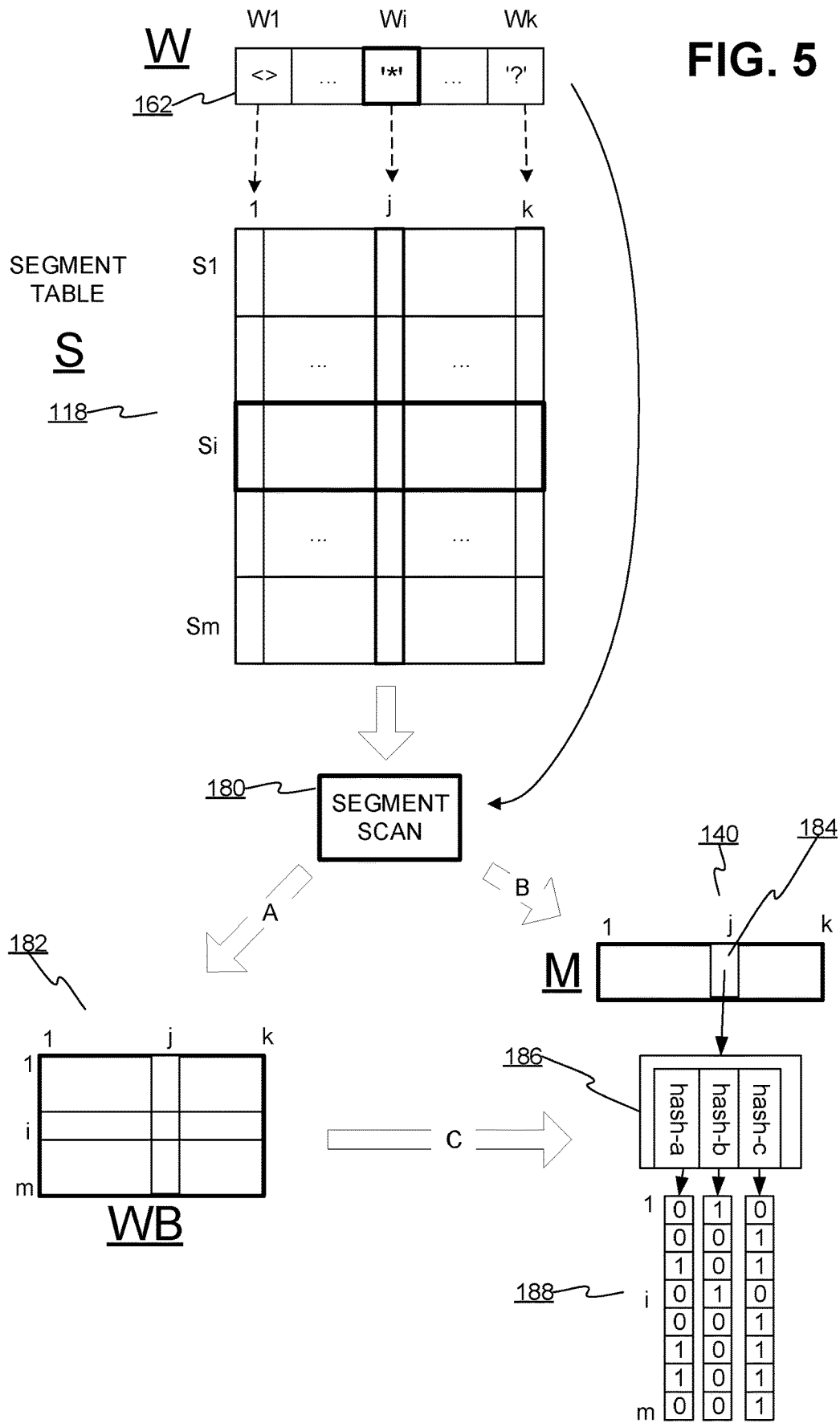
FIG. 5 shows a segment pre-processing phase for building the location map (MJ).

FIG. 5 shows a segment pre-processing phase for building the location map 140 (MJ). The wildcard list 162 (W) has m entries for the respective k index/join columns. The wildcard list 162 and segment table 118 are passed to a segment scanner 180, which partly implements the join operator 108. As described later with reference to FIG. 7, the segment scanner 180 scans the segment table 118 by segment 120 and column to build a wildcard map 182 (WB) and the location map 140 (M). The location map 140 indicates which field values are located at which column-X-segment. The location map 140 has a set of k pointers for the respective columns. Each pointer 184 points to a hash table for the respective column. In FIG. 5, Mj is the jth pointer to the jth hash table 186 for the jth index/join column.

The existence of a hash in the jth hash table indicates that at least one segment contains the hashed value in its jth column. Furthermore, each hash of each hash table has a respective bitmap 188 of m bits, each bit representing a respective segment; "1"s indicate respective segments that contain the corresponding hashed value. Thus, for a given bit B at position P, at a given bitmap BM, of a given hash H (hashed from value V), in a hash table at column J, bit B indicates for H/V whether value V is found in column J of segment P. Finally, as will be explained below, the wildcard map 182 is used to augment the location map 140 so that the location map 140 indicates locations, in the segment table 118, of field values as well as wildcards.

Figure 6:
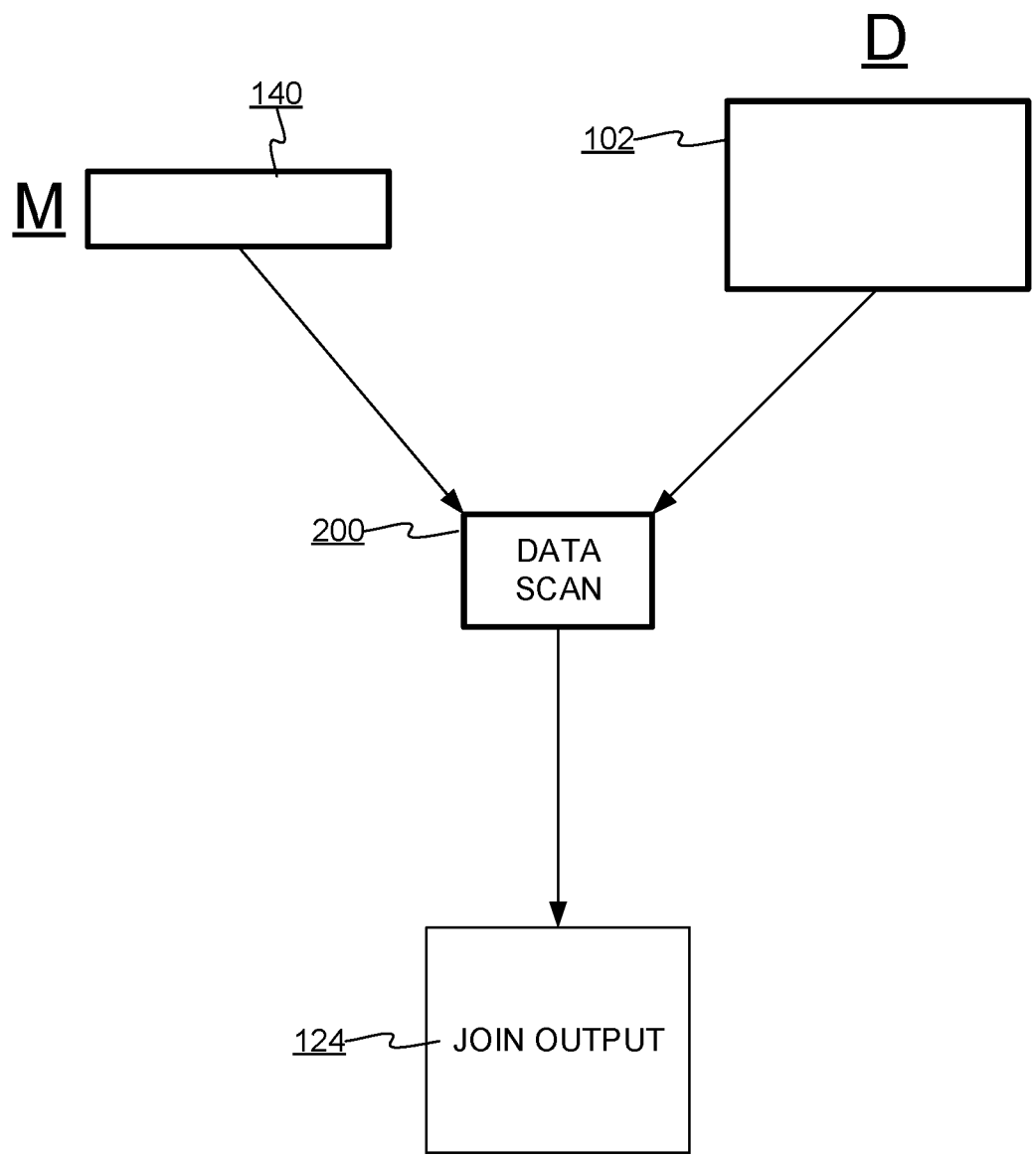
FIG. 6 shows a data scan that takes as input the dataset and the location map to produce a join output.

FIG. 6 shows a data scan 200 that takes as input the dataset 102 and the location map 140 to produce the join output 124. As will be discussed with reference to FIG. 8, the data scan 200, which is part of the implementation of the join operator 108, makes a pass through each dataset row 122 of the dataset 102, once for each index column. In effect, the content of every index field of every dataset row 122 is checked for presence in the location map 140 to perform the inner join, while at the same time allowing matches to wildcards in the segment table 118.

Figure 7:
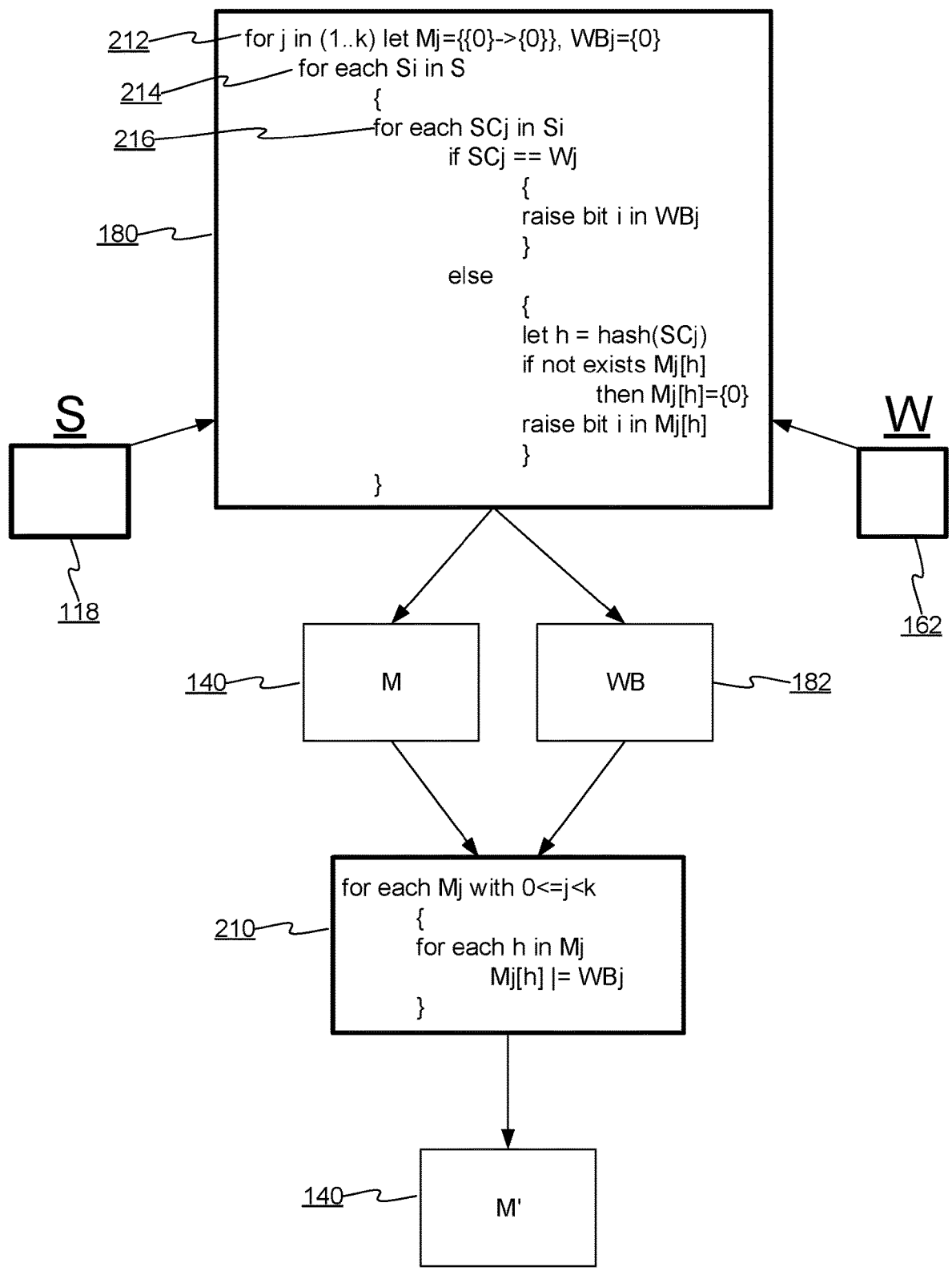
FIG. 7 shows details of a segment scanner and a post-processing step.

FIG. 7 shows details of segment scanner 180 and a post-processing step 210. The segment scanner 180 builds the location map 140 and the wildcard map 182. The segment scanner 180 starts with an outer loop 212 that enumerates the index columns 1 to k. An arbitrary current enumeration or iteration of the outer loop 212 will be represented as the jth index column (SCj). An inner loop 214 enumerates the segments 1 to m so that the jth column of each segment (Si) can be scanned. An arbitrary current enumeration or iteration of the inner loop will be directed to the ith segment (Si).

When segment Si is reached during the enumeration (from 1 to k) of column j, another loop 216 iterates over each field (SCj) in column j of segment Si. An arbitrary field at column j for Si will be referred to as SCj. The content of each SCj is checked. First, if SCj matches the wildcard for column j (found in Wj), then the ith bit in WBj is set to 1 (indicating that a wildcard value exists in Si at column j). If SCj doesn't match the wildcard for column j then its possible presence in Mj is checked. Specifically, SCj is hashed to h. If h has not yet been found in any segment (at column j), then h is added to the hash table of column j. In either case, for entry h in the hash table of column j, the corresponding bit i (for the current segment Si that is being enumerated) is set to 1 to indicate that h (and hence, the content of SCj) is present at column j of the ith segment (Si).

When the outer loop 212 completes, the location map 140 (M) contains a set of hash tables for the respective 1 through k index columns. Each hash table contains hashes for the respective values found in the corresponding column of the segments, and the bits of each bitmap associated with a hash indicate which segments the hash/field is found in. In other words, given an arbitrary field value F, if hash(F) exists in a given hash table of a given index column, then F exists in the given column of least one segment. Furthermore, the bits in the bitmap associated with the hash table entry of hash(F) indicate which segments contain F in the given column.

When the outer loop 212 completes, the wildcard map 182 (WB) has bits indicating where wildcards are found in the segment table, by segment and column. The post-processing step 210 is then performed. In effect, the bits in the location map 140 are updated to indicate the locations (by segment and column) of wildcards as well as locations of values in fields of the segments. The updated location map 140 (M') is then used in the data scanning phase.

Figure 8:
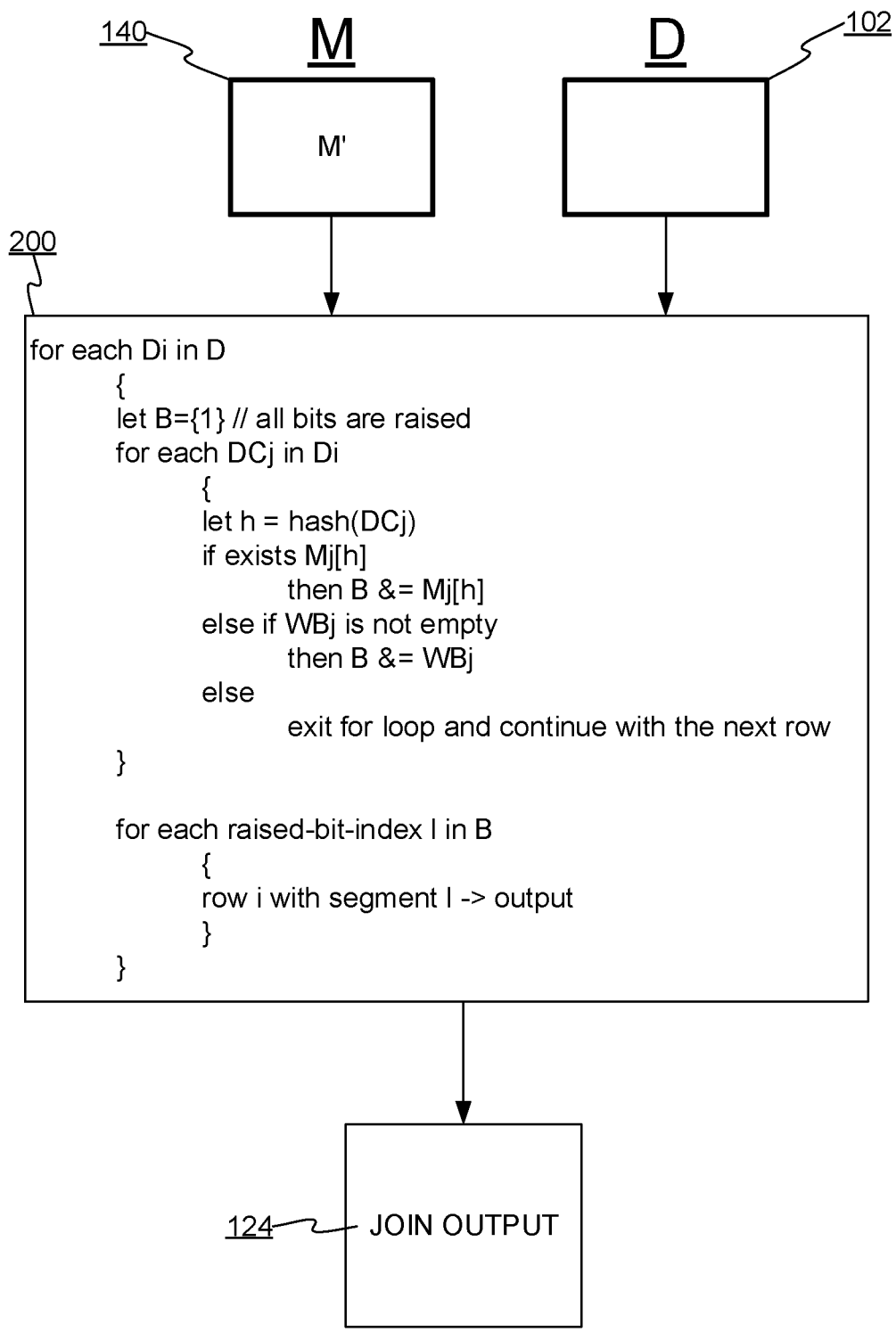
FIG. 8 shows details of a data scan phase.

FIG. 8 shows details of the data scan 200 phase. The wildcard-supplemented location map 140 and the dataset 102 are the inputs to the data scan 200. An outer loop of the data scan 200 enumerates the data rows of the dataset 102. Data row Di represents an enumeration of arbitrary data row i. A temporary bitmap B with m bits (one for each segment) is set all 1's. An inner loop enumerates the index fields/columns 1 . . . k of data row Di. DCj represents an arbitrary join field of row Di. A hash h of DCj is computed. There is a test to see if Mj[h] exists. In effect, this existence tests checks to see if DCj (represented by its hash) exists anywhere in column j of the segment table. If it does, then temporary bitmap B is bitwise-anded to Mj[h]. Otherwise, if WBj is not empty (i.e., there is a wildcard anywhere in column j of the segment table), then B is bitwise-anded to WBj. If neither condition is true then the current row Di does not contribute to the join output 124, it is not included in the join output 124, and the next dataset row is then processed. However, if either condition was true then each '1' bit in B represents a respective segment that has either a value or wildcard that matches DCj. In this case, those segments are joined to the Di and outputted as part of the join output 124. The loops repeat until each dataset row 122 has had each of its index columns checked. An example will be discussed below with reference to FIG. 9.

Regarding input to the join operator 108, the left side (or, source dataset) may be of arbitrary size. The right side—the segments table—may be created via existing segmentation algorithms noted above (e.g. machine classification, machine clustering), manually (custom crafted data tables), or via any other means. In one embodiment, each row defines a segment. The segments table must contain at least one column that corresponds to the column in the source dataset, which is similar to the known hash join algorithm. A column in a segment may contain an actual value or a "don't care" value. As discussed below, in one syntax of the join operator 108, a "don't care" value may be defined by a 'with wildcards typeof( . . . )= . . . ' statement, or a wildcard value may be "null" by default. For example: Event="Open", Country="USA", Severity=int(null) specifies a segment of the data that contains all events named "Open" that come from USA and have any severity. While a hardcoded limit is not needed, the size of the segments table might be around 20 k up to 100 k rows, although this is highly dependent on the physical resources available to any implementation.

Regarding the output 124 of the join operator 108, each row from the source dataset is duplicated for each segment from the segments table that it belongs to. A data row is skipped if it doesn't belong to any segment (see the "if exists" and "else if" in the data scan 200 code shown in FIG. 8). Output columns are comprised from columns from the source dataset and the segment table, which is similar to the known hash join operator where the "kind" of join is set to "inner". The output 124 can have many forms. For instance, the output 124 may be only the data rows for which matches were found in the segments. Or, each output row is a data row that includes its corresponding segment data (one instance for each match to a segment). If too many output data rows would result, an optimization of this form of output is that all data rows that belong to a segment may be aggregated in some form. For example, to build a time series containing an average of some metric.

A standard use case for the join operator 108 is to use segmented-join as a source of partitioned aggregation functions (e.g. count, sum or average). If the segment table contains a column (e.g. 'segment ID') which uniquely defines a segment, then the aggregation function could be computed while partitioning by that column. Another use case is to partition the data by unique column to generate a time series for each partition. The generated time series allows mining the segments for anomalies, trends, etc.

Regarding implementation of the join operator 108, The operator may be designed to process source data block by block and therefore its memory consumption might depend only on the segment table. For simplification, it may be assumed that there are no dependencies between source data rows, although modifications for same will be straightforward. Even if there is no hardcoded limit on the number of segments, a limit may be implicitly applied via a memory utilization check during segment processing. If actual data is passed instead of segments, then the memory check might fail, perhaps resulting in an informative failure message.

The algorithm described with reference to FIGS. 7 and 8 includes some simplifications. For example, all non-index columns are ignored. Memory allocations for maps, bitmasks, etc., are also ignored. Actual implementation may include various performance improvements. For instance, "and" operations may be implemented with hardware acceleration. Equal segments can be excluded from the operation (with only one of them left to represent them all) and then added formally after the join. Instead of producing too many records in case of heavily overlapping segments, required operations can be performed in-place. Also, looping through all raised bits in a bitmap may be done through the INTEL "bsf" instruction.

Discussion of complexity of the algorithm will shed light on its efficiency. Algorithm complexity per dataset row is $O(ceil(m/256)*k)$, where m is the number of segments, and k is the number of columns in each segment. With greater values of m, the linearity of the algorithm complexity becomes more apparent, which will impact the performance. Since the number of segments is not expected to be so large relative to the number of dataset rows, this should not be an impediment. In one experiment, performance checks showed that, for 100 k segments, the heart of the algorithm spent a mere 760 ns per segment column, which gives the worst time of 760*k ns for m<=100 k. While theoretically more than 100 k segments could be specified, this is unlikely for most data analysis scenarios. It is also expected that a memory usage check will gracefully fail the execution before a too-large number of segments will start to cause performance issues.

While the algorithm might not fully detach processing time from the number of segments, it does allow a hardware optimized calculation which gives good performance, as was experimentally confirmed for a maximum supported number of segments of 100 k. Finally, a linear dependency of performance of the algorithm is smoothed from the number of segments (ceil(m/256)).

To elaborate on complexity, k is also part of the complexity since the algorithm computes hashes and looks up corresponding bitmasks per column per row. But complexity is less than linear for m. The complexity, as noted above is: $O(ceil(m/256)*k)$ since, notably, bitmasks are used for segments. In many cases the number of segments is not large and within each group of 256 (for example) segments the algorithm behaves with the same performance.

Figure 9:
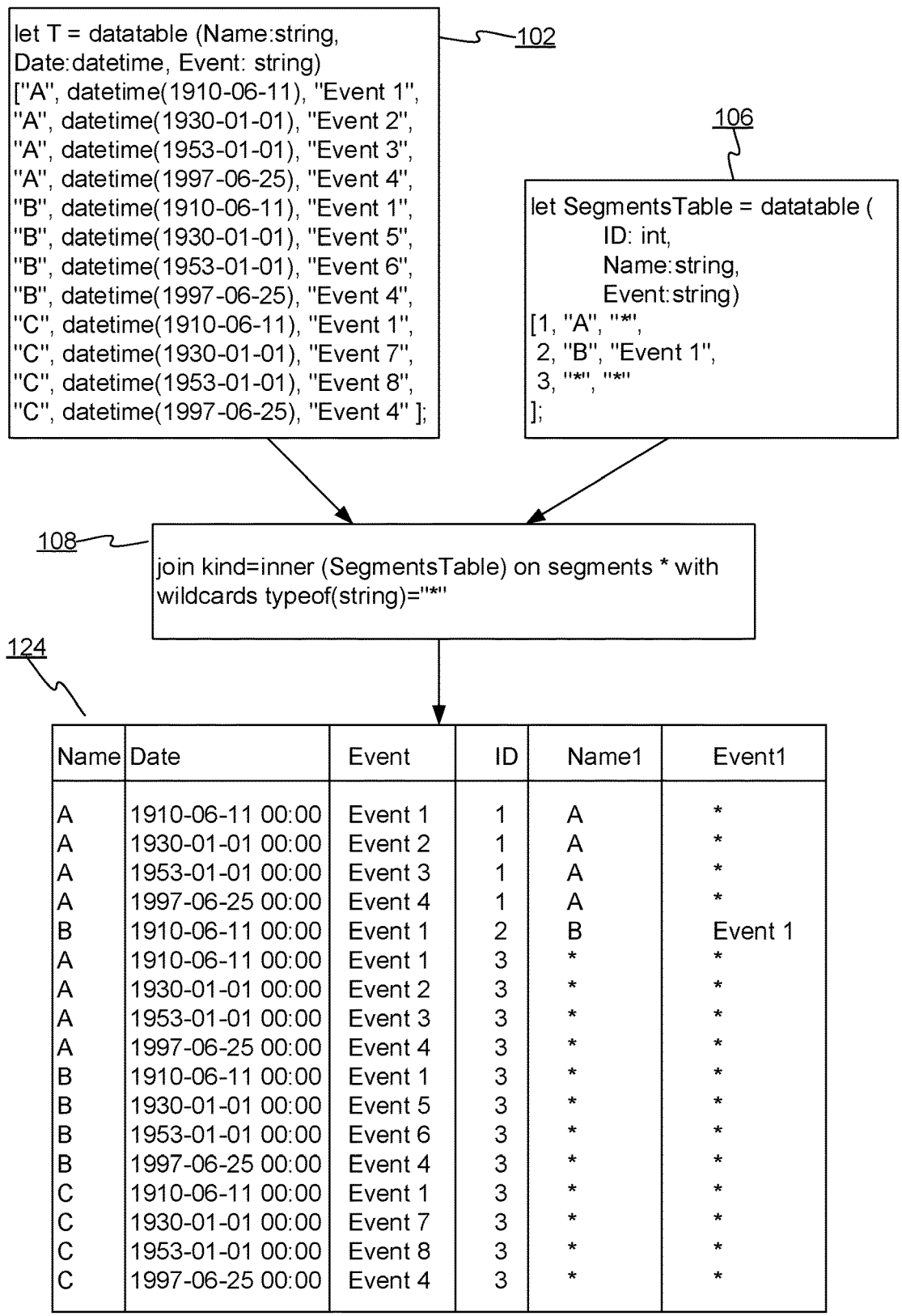
FIG. 9 shows an example of an inner join performed with wildcards.

FIG. 9 shows an example of an inner join with wildcards. The dataset 102 and segments table 106 are self-explanatory. the join operator 108 may be used in a pipeline-based data analysis system. The join operator 108 is expressed in conformance with the following hypothetical example join operator syntax:

```
<Source data>
| join (<Segments Table>)
on segments <*|<join columns>>
[typeof(<data type>)=<wildcard value>
    [, typeof(<data type>)=<wildcard value>...]].
```

Regarding this example syntax, to use segmented join the type of join operation may be implicitly "inner" or may be expressed explicitly as part of the syntax. The schema of the output of a join may be the same as the output of other inner joins. If the 'on segments *' syntax is used, then columns for the join may be chosen automatically by the algorithm using columns with the same name and possibly type. "Don't care" values are defined per data type using the 'typeof (<data type>)=<wildcard value>' syntax. For example, "typeof(string)='*'". By default, the "don't care" (wildcard) value for all types may be null. Thus, if a row of a segment table contains null in one of the columns then the corresponding segment may contain any value for this column (these columns should be explicitly included in an 'on' statement or via a '*' parameter).

As discussed above, the types of data that can be used are unlimited. Time series data will be particularly beneficial due to the nature of segments computed therefrom. The algorithm may be helpful with computer log data which can be so immense that teasing out trends is difficult without an ability to efficiently relate segments back to their source data.

Figure 10:
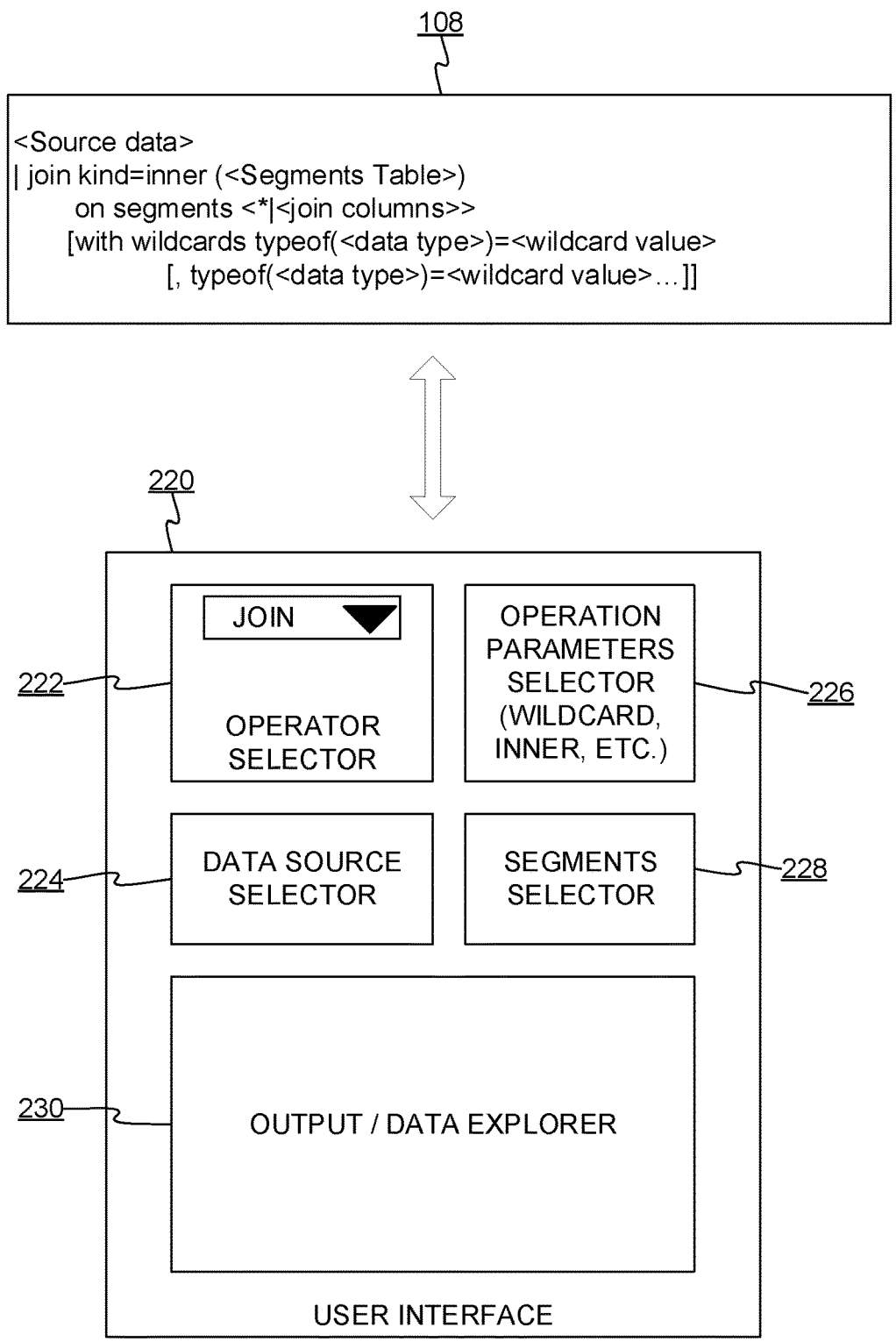
FIG. 10 shows a user interface for interacting with the join operator.

FIG. 10 shows a user interface 220 for interacting with the join operator 108. The user interface 220 comprises various user interface elements, including an operator selector 222 for specifying the join operator 108. A data source selector 224 may be provided to specify the dataset 102. A parameter selector 226 may be provided to set parameters such as 'inner', wildcard values, join columns, data types, etc. A user interface element to define or specify wildcard-based joining of segments may be helpful. A segments selector 228 is used to identify the segments to be joined. A data explorer area 230 is provided to display join outputs and optionally allow interactive exploration of both input and output data, display of such data as graphs, etc.

Figure 11:
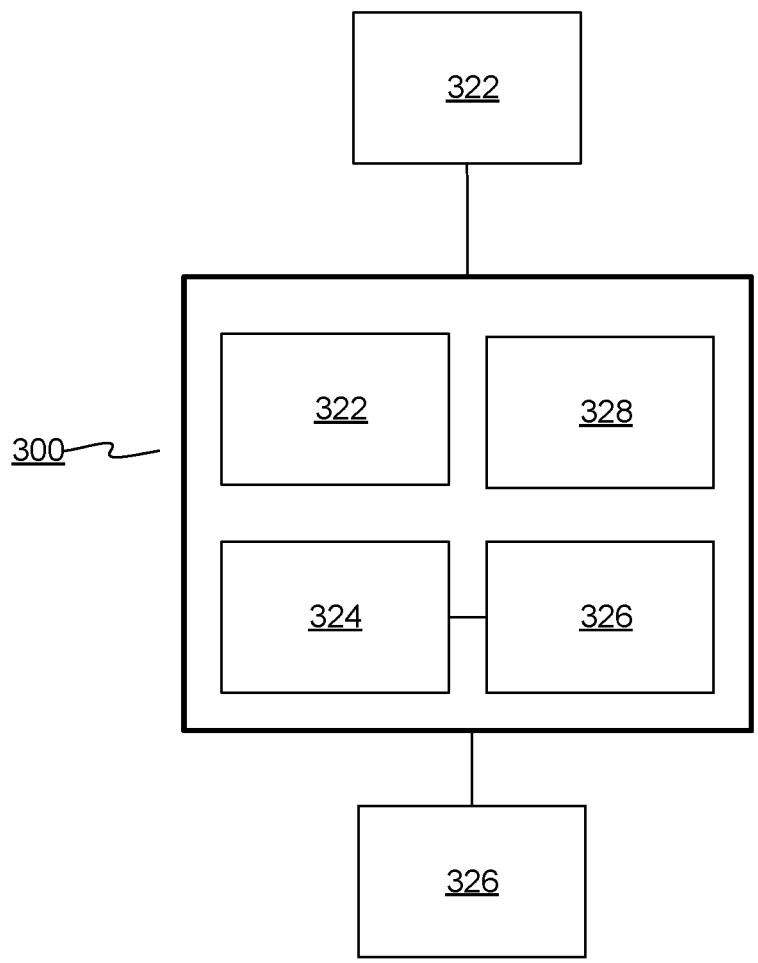
FIG. 11 shows details of a computing device on which embodiments may be implemented.

FIG. 11 shows details of the computing device 300 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 220 to implement any of the features or embodiments described herein.

The computing device 300 may have one or more displays 322, a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 300 may have any form-factor or may be used in any type of encompassing device. The computing device 300 may be in the form of a handheld device such as a smartphone, a tablet computer, a gaming device, a server, a rack-mounted or backplaned computer-on-a-board, a system-on-a-chip, or others. In one embodiment, a plurality of computing devices 300 cooperate to perform embodiments described herein. Some devices may provide source and segment data while others may cooperate to perform the join operation. It will be appreciated that layers of abstraction such as machine virtualization infrastructure and cloud constructs may lay between the computing hardware and the data analysis tools described herein.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 328. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by one or more computers comprising processing hardware and storage hardware, the method comprising:
    storing, in the storage hardware, a dataset, the dataset comprising data rows, the dataset further comprising dataset index columns, each data row comprising data fields in the dataset index columns, respectively;
    accessing the dataset from the storage hardware to generate a segments set, the segments set comprising segments, each segment comprising segment index columns, each segment comprising two or more segment rows, each segment row comprising segment fields in the segment index columns, respectively, wherein some of the segment rows comprise wildcard rows, each wildcard row comprising a wildcard in one or more of the corresponding segment fields, each wildcard comprising a value in a field of its corresponding wildcard row that indicates that the field in the corresponding row is not constrained to any single value, and wherein some of the segments comprise rows that are also in other segments;
    generating map data comprising column value maps for the respective segment index columns, the column value maps indicating which segment field values belong to which segments, the map data also comprising a wildcard map indicating which locations in the segments set contain respective wildcards, wherein the map data is generated by searching for wildcards while enumerating over the segment index columns and when a wildcard is found adding a location of the wildcard to the wildcard map;
    performing a join operation to generate an output of the join operation, the join operation joining the dataset and the segments set by enumerating over the data rows, wherein for each enumeration of a given data row:
        enumerating over the data fields of the given data row, wherein for each enumeration of a given data field, determining from the map data whether the given data field exists in any segment index column corresponding to the given data field in the column value maps or corresponds to a wildcard in the wildcard map; and
    storing the output of the join operation in the storage hardware.

2. A method according to claim 1, wherein the map data is generated by a single enumeration of the segment index columns over all of the segments, or is generated by a single enumeration of the segments over all of the segment index columns.

3. A method according to claim 1, wherein the output comprises aggregations of matching segment rows.

4. A method according to claim 1, wherein the join operation comprises an inner join and each data field in the joined columns of the dataset is checked only one time for existence in the map data.

5. A method according to claim 1, wherein the output of the join operation comprises a data row combined with a segment row, and the combined data row includes a wildcard from the combined segment row, the segment row having been joined with the data row based on the wildcard in the data row.

6. A method according to claim 1, further comprising providing a wildcard map that indicates which columns of which segments have wildcards.

7. A method performed by one or more computing devices comprising one or more processors and storage, the method comprising:
    storing a data table comprised of data rows and k index columns;
    storing a segments table comprised of m segments and k columns that correspond to the k index columns, the segments comprising segment rows and k columns that respectively correspond to the k index columns, wherein some of the segment rows comprise wildcard values in the k columns, each wildcard value in a field of its corresponding wildcard row indicating that the field in its corresponding row is indeterminate among a set of possible values, and wherein some of the segments comprise rows that are also in other segments;

generating a wildcard map indicating which locations in the segments contain a respective wildcard values, wherein the wildcard map is generated by searching for wildcard values while enumerating over the k index columns and when a wildcard value is found adding a location of the wildcard to the wildcard map; and invoking a segmented join operator comprising a join algorithm that joins the m segments with the data table on the k index columns, wherein execution time of the join algorithm scales less than linearly for m, wherein the join algorithm outputs a join dataset that includes data rows joined to segment rows that comprise wildcards, and wherein the join algorithm references the wildcard map while enumerating over the rows of the data table.

8. A method according to claim 7, wherein the segmented join operator comprises an inner join that performs a single scan of the segments table.

9. A method according to claim 8, wherein the segmented join operator further comprises a single scan of the data rows of the data table.

10. A method according to claim 7, wherein the m segments are derived from the data table, and wherein some of the data rows are in multiple segments.

11. A method according to claim 7, wherein the join dataset comprises at least some data rows joined to at least some segment rows on the basis of wildcards in the k columns of at least some segment rows.

12. A method according to claim 7, wherein the join operator comprises a syntax, and wherein the syntax comprises a first element to indicate whether a segmented join is to be performed, a second element to indicate a column to be joined, a third element to indicate a value of a wildcard, and a fourth element to indicate the segments table.

13. A method according to claim 7, wherein the join dataset comprises join rows, each join row comprising a column from the data table and a column from the segments table.

14. A computing device, comprising:
processing hardware configured to execute instructions to perform operations including:
storing, in storage hardware, a dataset, the dataset comprising data rows, the dataset further comprising dataset index columns, each data row comprising data fields in the dataset index columns, respectively;
accessing the dataset from the storage hardware to generate a segments set, the segments set comprising segments, each segment comprising segment index columns, each segment comprising one or more segment rows, each segment row comprising segment fields in the segment index columns, respectively, wherein some of the segment rows comprise wildcard rows having a wildcard in one or more of the corresponding segment fields, each wildcard comprising a value in a field of its corresponding wildcard row that indicates that the field is not constrained to any single value, and wherein some of the segments comprise rows also included in other segments;

generating map data indicating which segment field values belong to which segments, the map data also indicating which locations in the segments set contain respective wildcards, said generating map data including enumerating over the segment index columns for wildcards and adding a location of a found wildcard to the map data;

performing a join operation to generate an output of the join operation, the join operation joining the dataset and the segments set by enumerating over the data rows, wherein for each enumeration of a given data row:
enumerating over the data fields of the given data row, wherein for each enumeration of a given data field, determining from the map data whether the given data field exists in any segment index column corresponding to the given data field in the column value maps or corresponds to a wildcard in the wildcard map; and storing the output of the join operation in the storage hardware.

15. The computing device of claim 14, wherein the map data is generated by a single enumeration of the segment index columns over all of the segments, or is generated by a single enumeration of the segments over all of the segment index columns.

16. The computing device of claim 14, wherein the output comprises aggregations of matching segment rows.

17. The computing device of claim 14, wherein the join operation comprises an inner join and each data field in the joined columns of the dataset is checked only one time for existence in the map data.

18. The computing device of claim 14, wherein the output of the join operation comprises a data row combined with a segment row, and the combined data row includes a wildcard from the combined segment row, the segment row having been joined with the data row based on the wildcard in the data row.

19. The computing device of claim 14, further comprising a wildcard map that indicates which columns of which segments have wildcards.

20. The computing device of claim 14, wherein the join operation comprises a join operator having a syntax, wherein the syntax comprises a first element indicating whether a segmented join is to be performed, a second element indicating a column to be joined, a third element indicating a value of a wildcard, and a fourth element indicating the segments table.

* * * * *